United States Patent [19]

Van Sickle

[11] 4,442,385

[45] Apr. 10, 1984

[54] VARIABLE FREQUENCY DRIVE FOR A MOTOR-GENERATOR/ALTERNATOR SET

[75] Inventor: Robert J. Van Sickle, Richmond, Va.

[73] Assignee: Power Distribution, Inc., Richmond, Va.

[21] Appl. No.: 465,590

[22] Filed: Feb. 10, 1983

[51] Int. Cl.³ .............................................. H02P 7/66
[52] U.S. Cl. ................................... 318/140; 318/150; 318/157; 318/146; 318/246; 318/151; 318/152; 310/113; 322/29; 322/32
[58] Field of Search ............... 318/140, 151, 152, 139, 318/148, 146, 158; 322/29, 32, 38–43; 307/47, 68, 153; 310/113; 290/5

[56] References Cited

U.S. PATENT DOCUMENTS

| | | | |
|---|---|---|---|
| 827,331 | 7/1906 | Tirrill | 310/113 |
| 919,302 | 4/1909 | Armstrong | 310/113 |
| 1,092,797 | 4/1914 | Mavor | 310/102 |
| 1,150,019 | 8/1915 | Dyer et al. | 310/113 |
| 1,531,853 | 3/1925 | Fisher | 310/113 |
| 2,778,960 | 1/1957 | Anderson | 310/113 |
| 3,609,426 | 9/1971 | Gaul | 310/112 |
| 3,639,820 | 2/1972 | Stemmler | 318/147 |

Primary Examiner—G. Z. Rubinson
Assistant Examiner—Shik L. Paul
Attorney, Agent, or Firm—Richard P. Matthews

[57] ABSTRACT

A variable frequency drive for a motor-generator/alternator set which is used to supply electrical power to computer or data processing equipment. Power failures in commercially supplied power results in aberrations and erroneous computations in computers and data processing equipment. An induction motor is used to drive a generator/alternator. The induction motor is driven below the synchronous speed of the generator/alternator and a variable speed drive increases the velocity supplied to the generator/alternator, preferably to a point above its synchronous speed. Therefore, when there is a commercial power failure, the generator/alternator remains within a desired frequency range for a longer period of time than a comparable generator/alternator driven at synchronous speed.

3 Claims, 2 Drawing Figures

VARIABLE FREQUENCY DRIVE FOR A MOTOR-GENERATOR/ALTERNATOR SET

This invention relates to a method of and apparatus for driving a motor-generator/alternator especially useful for supplying electrical power to computer or data processing equipment and, more particularly, to such a method and apparatus which will maintain a generator/alternator within a desired frequency range for longer periods of time in the event of commercial power failure.

BACKGROUND OF THE INVENTION

Motor-generator/alternator sets have become useful in supplying electrical power requirements for computer applications because the power supplied directly from electric utilities contains far too much electrical noise which can easily produce computing errors. A motor-generator/alternator set provides the necessary buffered or isolated power protected system for these applications.

There are two popular types of motors being used to drive A.C. generators/alternators, namely, synchronous motors and induction motors. Synchronous motors always run at rated speed regardless of voltage changes. They would clearly be the choice for computer or data processing applications except for one major fault. Synchronous motors are hard to start.

This deficiency or shortcoming in synchronous motors is particularly troublesome in computer applications because the motor must restart after every momentary outage of electrical power. Heretofore, the solution has been to utilize costly, complicated, failure prone, solid state control packages to get the synchronous motor back on line instantly. Regardless of which control package is used, the users have experienced many more failures in the backup system than in the motor itself.

Induction motors, on the other hand, are easy to start. They restart on line after an outage without complicated control circuits thereby making them a clear choice for computer applications.

However, induction motors have an inherent shortcoming which heretofore has not been addressed for computer and data processing applications. Induction motors will not maintain their frequency over a broad voltage and load range by themselves. Computer manufacturers specify an input frequency range from 59.5 Hz to 60.5 Hz. This specification is important for memory units which are very sensitive to frequency. One other important specification established by the National Electrical Manufacturers Association (NEMA) is that voltage variation for motor input shall not exceed ±10% from a rated voltage of 460 volts even though most computer facilities are wired for 480 volts. NEMA says that motors should be able to run at full load indefinitely with a voltage input within ±10% of rated voltage.

However, induction motors have still another undesirable characteristic which tends to discourage their use in computer related applications; i.e., induction motors possess slip. "Slip" may be defined as the difference between synchronous speed (e.g. 1800 rpm) and the actual output speed in revolutions per minute. It is common to see industrial grade induction motors with slip ratings between 1% and 3%. This means that their output speed will be 1% to 3% less than synchronous speed. High cost, limited slip motors are readily available that reduce slip to as little as ½% but more commonly to around 0.7%. However, a slip of ½% yields an output of 59.7 hz. which is barely above the computer manufacturers' 59.5 hz. minimum requirement. If the voltage falls or the load increases, these induction motors no longer would produce acceptable computer power.

SUMMARY OF THE INVENTION

In accordance with the present invention, the problems which prevented the use of induction motors in combination with generators/alternators are effectively overcome by driving the induction motor below the synchronous speed of the generator/alternator and interposing a speed changer between the induction motor and the generator/alternator to drive the latter faster than the induction motor. This produces a higher frequency output from the generator/alternator which may be set to fall within a desired frequency range. Therefore, when a failure occurs in the commercial power, the generator/alternator remains within the desired frequency range for a longer period of time than a gnerator/alternator which had not been run at the higher speed and concomitant higher frequency.

In effect both a variable speed and variable frequency drive is produced. This invention makes it possible to accommodate slip variables from one size induction motor to another and to accommodate induction motors from one manufacturer to another.

In addition, high cost, limited slip induction motors are not required since the variable speed drive can be made to compensate for different slip characteristics. Thus, cost savings of up to 3 to 1 are possible.

The inherent advantages and improvements of the present invention will become more apparent upon reference to the following detailed description of the invention and by reference to the accompanying drawings wherein.

DETAILED DESCRIPTION OF THE INVENTION

Figure 1:
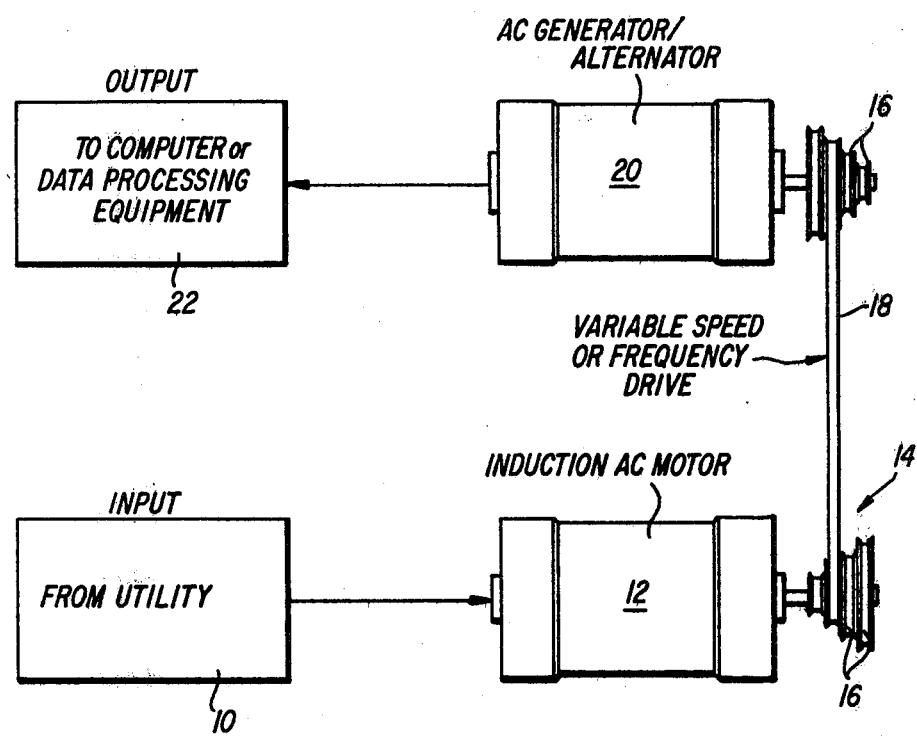
FIG. 1 is a schematic view of the apparatus of the present invention.

Referring now to FIG. 1 of the drawings, there is shown a schematic illustration of the apparatus of the present invention. Commercial power from a utility company is illustrated as the input 10 to an induction AC motor 12. A speed changer 14 is located on the output shaft therefrom with a plurality of drive pulleys 16 selectively accommodating a belt 18 in order to drive the input shaft of an AC generator/alternator 20 on which is located a corresponding set of pulleys 16. The output 22 of the AC generator/alternator is especially useful in supplying electrical power to computers or data processing equipment. In actual practice, the AC generator/alternator will be driven faster than the induction AC motor 12 in order to overcome the slippage of the induction motor and to provide a greater period of time following an interruption of commercial power from an electric utility company that the generator/alternator remains within prescribed or desired frequency limits.

Figure 2:
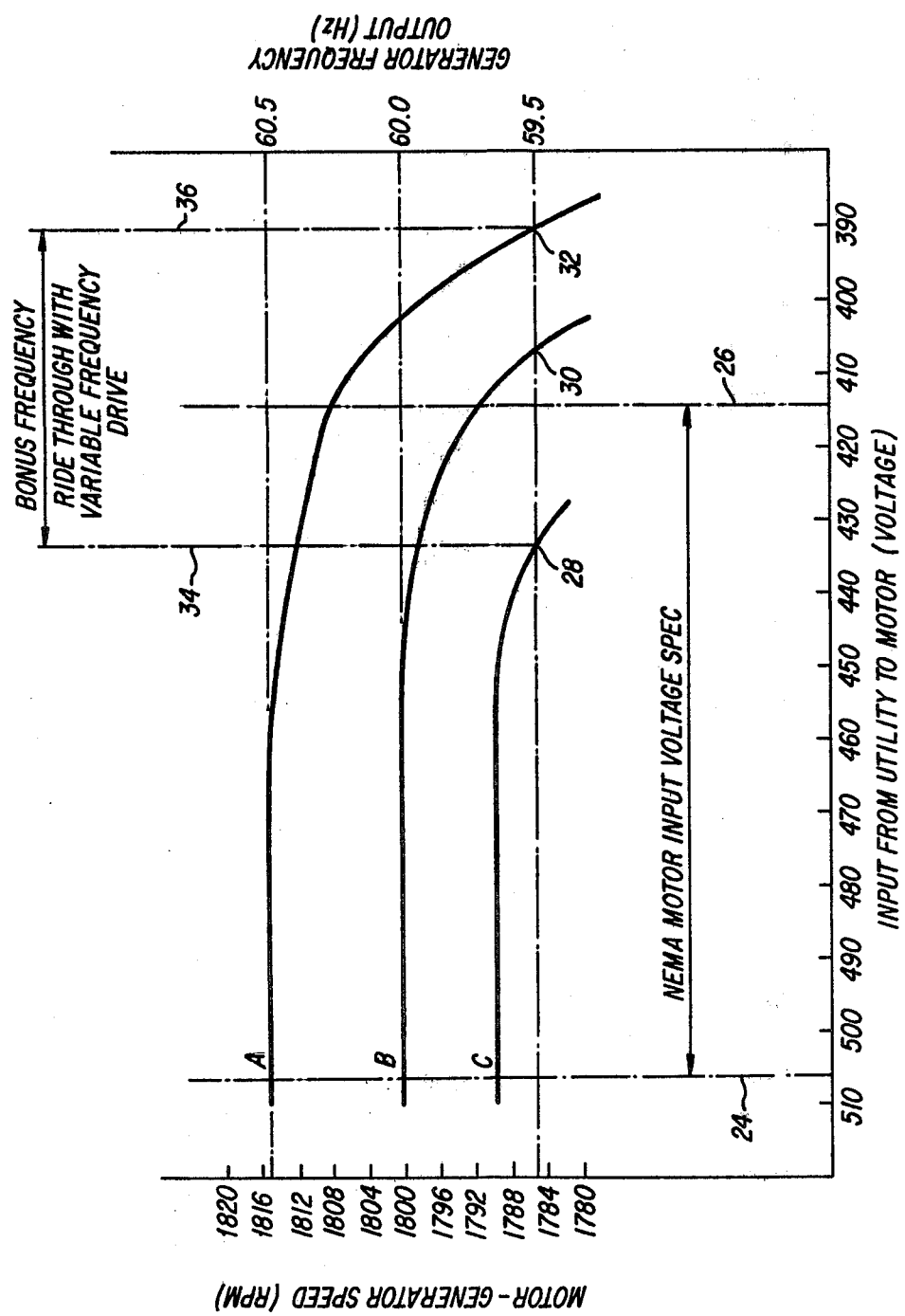
FIG. 2 is a graph of motor-generator speed and generator frequency each plotted against input voltage to the motor.

Referring now to FIG. 2 there are shown three load characteristic curves which plot motor-generator speed in revolutions per minute (rpm) along the left ordinate versus input voltage from the utility to the motor along the abscissa and measured in volts. These load curves are designated A, B and C. The right ordinate of the graph shows a plot of generator frequency output measured in hertz (hz.).

The National Electrical Manufacturers Association's (NEMA) range specification that states that motors should be able to run at full load indefinitely within ±10% of a rated voltage of 460 volts is shown by vertical dot-dash lines at 24 for 506 volts and at 26 for 414 volts.

The plot C is for an AC induction motor having a rated slippage of ½% which yields an output of 59.7 hz. and to which the speed changer of the present invention has not been applied. By the use of the present invention, the generator/alternator 20 is turned faster than the motor 12 so that for the same input voltage the output frequency of the generator can be set at exactly 60 Hz. This plot is shown at B. While the schematic representation for the speed changer apparatus 14 would indicate that speed changes are made in discrete steps, it is preferred that the speed changer 14 be infinitely variable so that precise settings may be made.

In a preferred mode of operation, the generator/alternator output frequency is adjusted to the computer manufacturers' upper limit of acceptable frequency, namely 60.5 hz. This plot is shown at A.

The points at which plots C, B and A drop below the acceptable minimum frequency are shown at 28, 30 and 32 respectively. Therefore, it will be seen that what is labeled as a bonus frequency or ride through provided with the variable frequency drive between dot-dash vertical lines 34 and 36 that the curve remains within the desired frequency.

It is also significant to note that an induction motor as shown in plot C does not comply with the NEMA motor input voltage specification in that the frequency drops to an unacceptable level before a voltage of 10% less than rated voltage is reached.

While the invention has been illustrated and described with respect to a preferred embodiment thereof, it will be recognized that the invention may be otherwise variously embodied and practiced within the scope of the claims which follow.

I claim:

1. A method of operating a motor-generator/alternator set used to supply power to computer or data processing equipment, said motor-generator/alternator set having a synchronous speed of 1800 rpm at 60 Hz with a desired frequency variation of ±0.5 Hz which comprises the steps of
 a. supplying commercial power to an induction motor to drive said induction motor at a speed below said synchronous speed,
 b. introducing a speed changer between said induction motor and said generator/alternator so said generator/alternator can produce a frequency greater than said synchronous frequency but within said desired frequency variation therefrom,
  1. whereby upon the failure of said commercial power, power from said generator/alternator remains within the desired frequency range for a longer period of time than power from a comparable generator/alternator driven at lower speed.

2. A method of operating a motor-generator/alternator set as defined in claim 1 including the additional step of driving said generator/alternator at that speed in excess of synchronous speed that produces the maximum frequency for said generator/alternator within the desired frequency variation.

3. A method of operating a motor-generator/alternator set as defined in claim 1 wherein said step of introducing a speed changer consists of mounting a variable speed belt drive between said motor and said generator/alternator.

* * * * *